(12) United States Patent
Goulet (10) Patent No.: US 11,821,569 B2
(45) Date of Patent: Nov. 21, 2023

(54) BAND CLAMP INSULATION SYSTEM

(71) Applicant: SAPREX, LLC, Gastonia, NC (US)

(72) Inventor: Robert Jacque Goulet, Gastonia, NC (US)

(73) Assignee: Nelson Global Products, Inc., Stoughton, WI (US)

( * ) Notice: Subject to any disclaimer, the term of this patent is extended or adjusted under 35 U.S.C. 154(b) by 1266 days.

(21) Appl. No.: 16/339,481

(22) PCT Filed: Oct. 4, 2017

(86) PCT No.: PCT/US2017/055081
§ 371 (c)(1),
(2) Date: Apr. 4, 2019

(87) PCT Pub. No.: WO2018/067665
PCT Pub. Date: Apr. 12, 2018

(65) Prior Publication Data
US 2020/0049303 A1   Feb. 13, 2020

Related U.S. Application Data

(60) Provisional application No. 62/404,047, filed on Oct. 4, 2016.

(51) Int. Cl.
| | | |
|---|---|---|
| *F16L 59/21* | (2006.01) | |
| *F16L 13/02* | (2006.01) | |
| *F16L 59/02* | (2006.01) | |

(52) U.S. Cl.
CPC ........... *F16L 59/21* (2013.01); *F16L 13/0236* (2013.01); *F16L 59/028* (2013.01)

(58) Field of Classification Search
CPC ....... F16L 13/0236; F16L 33/08; F16L 33/03; F16L 25/14; F16L 57/00; F16L 23/04; F16L 59/21; F16L 59/028
See application file for complete search history.

(56) References Cited

U.S. PATENT DOCUMENTS

| | | | |
|---|---|---|---|
| 1,966,341 A | 7/1934 | Galbraith | |
| 3,000,433 A | 9/1961 | Kemper | |
| (Continued) | | | |

FOREIGN PATENT DOCUMENTS

| | | |
|---|---|---|
| WO | 9909344 A1 | 2/1999 |
| WO | 2005085608 A1 | 9/2005 |

OTHER PUBLICATIONS

International Preliminary Report on Patentability dated Apr. 18, 2019 for related International Patent Application No. PCT/US2017/055081.

(Continued)

*Primary Examiner* — Daniel J Wiley
(74) *Attorney, Agent, or Firm* — Moore & Van Allen, PLLC; Henry B. Ward, III (57) ABSTRACT

Embodiments of the invention provide a novel band clamp insulation system for ensuring a tight insulation around a pipe during extended operation of the system and mitigating adverse effects of differential thermal expansion. The band clamp insulation system typically comprises a band clamp for securing insulation around the pipe and a securing member fixed to the pipe. The band clamp insulation system further comprises a coupling member for fastening the band clamp and the coupling member together.

11 Claims, 6 Drawing Sheets

(56) References Cited

U.S. PATENT DOCUMENTS

| | | | | |
|---|---|---|---|---|
| 3,053,715 | A | | 9/1962 | Labino |
| 3,311,957 | A | | 4/1967 | Dunn |
| 3,754,303 | A | * | 8/1973 | Pollock ................ B65D 63/06 24/23 W |
| 4,073,317 | A | * | 2/1978 | Ellis ........................ F16L 3/137 24/270 |
| 4,093,282 | A | * | 6/1978 | Kyriakodis ............. F16L 33/08 285/259 |
| 4,358,139 | A | * | 11/1982 | Hoy ........................ F16L 21/08 156/173 |
| D270,997 | S | * | 10/1983 | Kanao ............................ D8/396 |
| 4,567,626 | A | * | 2/1986 | Kimbrough ............. H01J 29/87 220/2.1 A |
| 4,866,817 | A | * | 9/1989 | Espevik ................ B25B 25/005 24/23 W |
| 4,874,191 | A | * | 10/1989 | Green ..................... F16L 13/16 285/332.3 |
| 5,985,385 | A | | 11/1999 | Gottfried |
| 6,354,937 | B1 | * | 3/2002 | Crook ................. F24F 13/0209 138/172 |
| 7,171,729 | B2 | * | 2/2007 | Bulanda .................. F16L 3/233 24/23 R |
| 10,065,776 | B2 | * | 9/2018 | Prevot .................... B65D 63/08 |
| 10,479,572 | B2 | * | 11/2019 | De Vittori .............. B60R 21/16 |
| 2007/0035122 | A1 | | 2/2007 | Smith et al. |
| 2008/0185841 | A1 | | 8/2008 | Ignaczak et al. |

OTHER PUBLICATIONS

Supplemental European Search Report issued by the European Patent Office for International Patent Application No. PCT/US2017/055081 dated Jun. 26, 2020.

Office Action issued by the European Patent Office for European Patent Application No. 17 859 092.3, dated Apr. 19, 2022.

International Search Report dated Dec. 11, 2017, for related International Patent Application No. PCT/US2017/055081.

Written Opinion dated Dec. 11, 2017, for related International Patent Application No. PCT/US2017/055081.

\* cited by examiner

BAND CLAMP INSULATION SYSTEM

FIELD OF THE INVENTION

Embodiments disclosed herein relate to insulation systems for pipes and ducts in general, and clamping apparatuses and methods in particular.

BRIEF SUMMARY

Embodiments of the invention are directed to band clamp insulation system configured for insulating a hollow tubular member and reducing formation of gaps due to differential thermal expansion of the hollow tubular member and the insulation. The band clamp insulation system typically comprises: a securing member having a first elongate member, wherein a predetermined fixing portion of the securing member is configured to be affixed to the hollow tubular member; a band clamp member configured for securing an insulation cover between the band clamp member and the hollow tubular member, wherein the band clamp member comprises a second elongate member and a clamping member; and a coupling member configured for fastening the first elongate member affixed to the hollow tubular member and the second elongate member positioned around the hollow tubular member.

In some embodiments, and in combination with the above embodiment, the coupling member is configured to fasten the first elongate member and the second elongate member at a first angle between 0 degrees and 90 degrees.

In some embodiments, and in combination with any of the above embodiments, the coupling member is configured to fasten the first elongate member transversely with the second elongate member.

In some embodiments, and in combination with any of the above embodiments, the coupling member further comprises: a first connector configured for receiving the second elongate member positioned around the hollow tubular member; and an adjacent second connector configured for receiving the first elongate member affixed to the hollow tubular member; wherein the first elongate member is oriented in a direction transverse to the second elongate member.

In some embodiments, and in combination with any of the above embodiments, the second connector comprises a central portion affixed to the first connector and two flexible free portions on either side of the central portion.

In some embodiments, and in combination with any of the above embodiments, the two flexible free portions are configured to be folded over the central portion for securing the first elongate member.

In some embodiments, and in combination with any of the above embodiments, the securing member comprises a flexible free portion adjacent to the predetermined fixing portion, wherein the coupling member is configured to receive the flexible free portion folded over the predetermined fixing portion.

Some embodiments of the invention are directed to a band clamp insulation assembly configured for insulating a hollow tubular member, comprising: a securing member positioned on an outer surface of the hollow tubular member, the securing member having a first elongate member, wherein a predetermined portion of the planar securing member is affixed to the hollow tubular member; an insulation cover positioned around the hollow tubular member; a band clamp member positioned around the hollow tubular member, the band clamp member securing the insulation cover between the band clamp member and the hollow tubular member, wherein the band clamp member comprises a second elongate member and a clamping member; and a coupling member configured for fastening the first elongate member affixed to the hollow tubular member and the second elongate member positioned around the hollow tubular member.

In some embodiments, and in combination with any of the above embodiments, the securing member is oriented in a direction substantially parallel to a longitudinal axis of the hollow tubular member.

In some embodiments, and in combination with any of the above embodiments, the coupling member further comprises: a first connector configured for receiving the second elongate member; and an adjacent second connector configured for receiving the first elongate member.

In some embodiments, and in combination with any of the above embodiments, the coupling member is positioned on the band clamp member with the second elongate member extending through the first connector.

Some embodiments of the invention are directed to a method of providing insulation for a hollow tubular member, the method comprising: providing a hollow tubular member, the hollow tubular member defining a longitudinal axis; providing a securing member having a first elongate member; positioning the securing member on an outer surface of the hollow tubular member and, securing a predetermined portion of the securing member to the hollow tubular member; providing an insulation cover; positioning the insulation cover around the hollow tubular member such that the insulation cover overlaps at least a portion of the securing member; providing a band clamp coupling assembly comprising: a band clamp member comprising a second elongate member and a clamping member; and a coupling member configured for fastening the first elongate member affixed to the hollow tubular member and the second elongate member positioned around the hollow tubular member; wherein the second elongate member is inserted through the coupling member; positioning the band clamp coupling assembly around the hollow tubular member, the band clamp member securing the insulation cover between the band clamp member and the hollow tubular member.

In some embodiments, and in combination with any of the above embodiments, securing the predetermined portion of the planar securing member to the hollow tubular member comprises spot welding the first elongate member to the hollow tubular member at the predetermined portion.

In some embodiments, and in combination with any of the above embodiments, the method further comprises: securing a predetermined portion of the securing member to the hollow tubular member such that a free flexible end portion of the first elongate member is formed adjacent the predetermined portion, the predetermined portion being located between the insulation cover and the free flexible end portion; positioning the band clamp coupling assembly around the hollow tubular member such that the coupling member is aligned with the free flexible end portion; and folding the free flexible end portion over the coupling member to secure the first elongate member.

BRIEF DESCRIPTION OF THE DRAWINGS

The present embodiments are further described in the detailed description which follows in reference to the noted drawings by way of non-limiting examples of the present embodiments on which like reference numerals represent parts throughout the several views of the drawings.

The foregoing and other features of the invention, and the manner in which the same are accomplished, will become more readily apparent upon consideration of the following detail description of the invention taken in conjunction with the accompanying drawings, which illustrate non-limiting examples of embodiments of the present invention and which are not necessarily drawn to scale In the drawings.

DETAILED DESCRIPTION OF EMBODIMENTS OF THE INVENTION

The following detailed description refers to the accompanying drawings, which illustrate specific embodiments. Other embodiments having different structures and operation do not depart from the scope of the present disclosure.

Certain terminology is used herein for convenience only and is not to be taken as a limitation on the embodiments described. For example, words such as "top", "bottom", "upper," "lower," "left," "right," "horizontal," "vertical," "upward," and "downward" merely describe the configuration shown in the figures. Indeed, the referenced components may be oriented in any direction and the terminology, therefore, should be understood as encompassing such variations unless specified otherwise. Throughout this disclosure, where a process or method is shown or described, the method may be performed in any order or simultaneously, unless it is clear from the context that the method depends on certain actions being performed first.

Piping and tubing systems for industrial, automotive, recreational vehicles, HVAC ducting and other applications typically involve transport of fluids. Here, sleeves, covers or other similar elements are often provided over one or more portions of the pipes for thermal insulation of the pipe and/or the fluid transported therein, pipe protection, structural support and reinforcement of the pipe, and/or other purposes. These sleeves, covers, wraps or the like that are configured to be provided on the pipes are hereinafter referred to as "pipe insulation." In this regard, it is often crucial that the inner surface of the pipe insulation is positioned tightly, in a close fit, and/or without any gaps with the pipe surface to ensure that the sleeve remains in the desired position on the pipe and provides the required insulation or protection. In some instances, conventional band clamps may be employed to secure the insulation onto the pipe. However, during practical applications the deferring thermal expansion properties of the pipes and the pipe insulation causes unavoidable gaps between the insulation and the pipe thereby weakening the desired tight fit.

Thermal expansion is directed to the modification of physical dimensions (increase and/or decrease in area, volume, and/or shape) of materials/components in response to heat transfer and changes in temperature. Typically, different materials comprise different coefficients of thermal expansion (fractional change in physical dimension per degree change in temperature) and as such exhibit different degrees of thermal expansion properties at given a pressure and temperatures gradient. Typically, extended usage and repetitive and cyclic variations in temperature of the pipe and insulation, due to heat transfer from the fluid transported by the pipe and/or other operating conditions such as component vibrations, during practical applications may cause gaps to be developed between the insulation and the pipe. For instance, a metallic exhaust pipe of an automobile may comprise a layered composite pipe insulation around a predetermined portion. Here, heat transfer from hot exhaust gases may cause an increase in temperature of the pipe and the insulation. The metal having greater thermal expansion coefficients (for example, 2-10 times greater) in comparison with that of the composite insulation, the metal would expand much more than the insulation. The increased expansion of the metal of the exhaust pipe, and particularly the outer circumference, may exert hoop and radial stresses on the insulation causing the insulation to stretch along with the pipe. The pipe, and consequently the insulation, may return to their original dimensions once initial/ambient temperature and/or thermal equilibrium is restored. However, after extended use, (for example, 100,000 miles or more of automobile travel), the repetitive/cyclic stresses on the composite insulation may irreversibly modify the structure and dimensions of the composite insulation, such that the insulation is not restored to its original state. Subsequently, gaps (for example, gaps with dimensions of several thousandths of an inch) may be formed between the composite insulation and the pipe at one or more locations/portions along the outer surface of the pipe. These gaps may cause the composite insulation to dislocate/slip along radial and/or axial directions of the pipe, adversely affecting the insulation and protection of the pipe by the composite insulation. Furthermore, this dislocation/slip may be exacerbated by the vibration and other operating conditions of the pipe, requiring the insulation to be replaced often.

Figure 1:
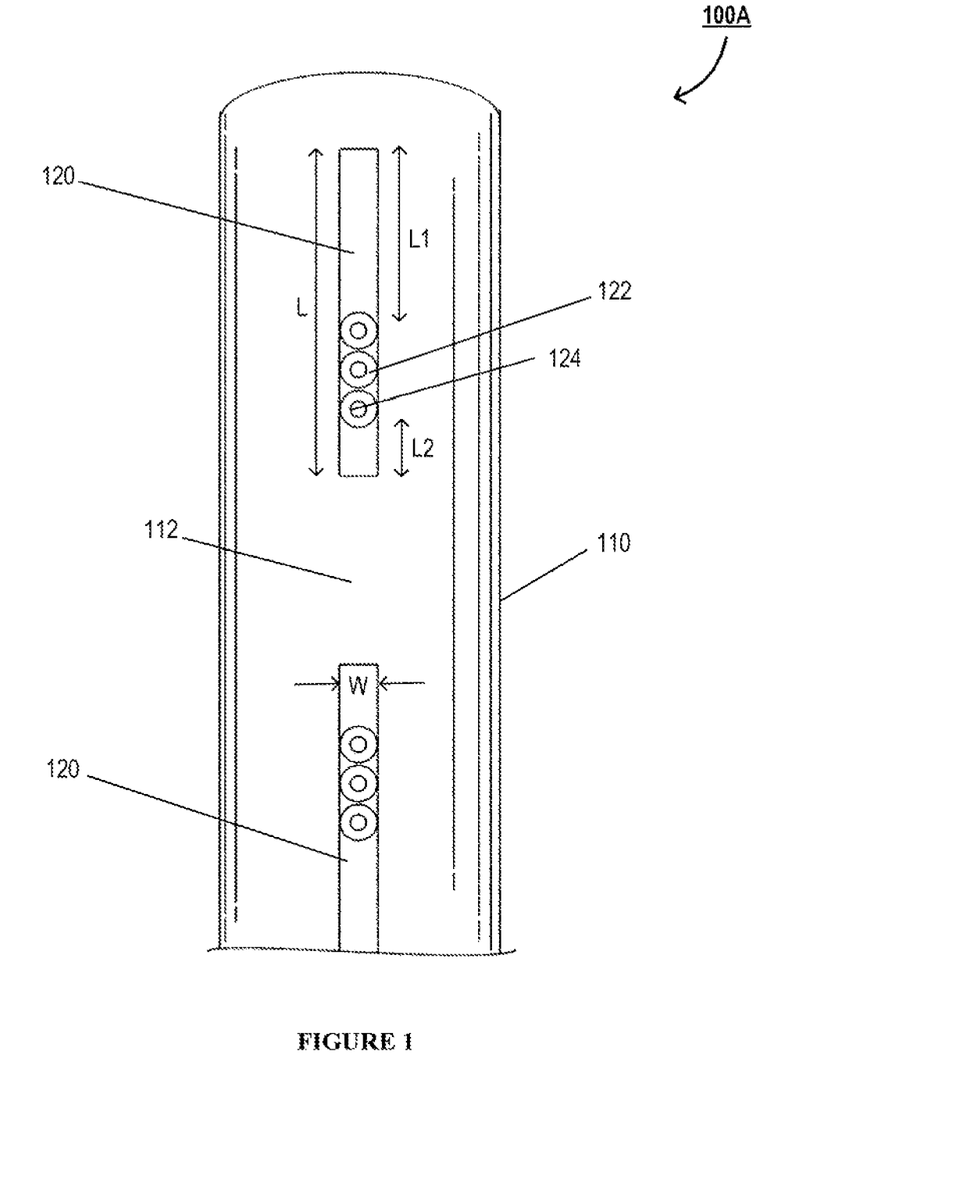
FIG. 1 illustrates a top view of the band clamp insulation system 100A, in accordance with some embodiments of the invention.

The present invention alleviates the aforementioned concerns and provides a novel band clamp insulation system for ensuring a tight insulation around the pipe during extended operation of the system, greatly prolonging the efficacy of the insulation. Embodiments of the present invention are directed to significantly reducing the frequency of occurrence and minimizing the dimensions of the gaps, thereby improving the functioning of the insulation for increased periods of time. The novel band clamp insulation of the present invention also works to preclude the dislocation of the insulation due to component vibration. The band clamp insulation system will now be described with respect to FIGS. 1-5, illustrating various facets of the insulating system in accordance with some embodiments of the invention. FIG. 1 illustrates a top view of the band clamp insulation system 100A, in accordance with some embodiments of the invention. Specifically, FIG. 1 illustrates an insulation system for a pipe 110. A "pipe" as used herein refers to a tubular elongate member with a predetermined cross-section, for example a hollow tube, pipe or hose. FIG. 1 further illustrates one or more securing straps 120 or securing members 120 positioned/affixed along suitable locations on the pipe 110. The securing straps 120 are typically located on the pipe 110 at or proximate the ends of the portions 112 of the pipe 110 that are required to be insulated. Furthermore, multiple straps may be provided along the circumference of the pipe 110 (not illustrated) at suitable angular intervals (at every 30 degrees, 60 degrees or 90 degrees along the circumference). For example, for an angular interval of 90 degrees, another securing strap 120 may be provided diametrically opposite to the strap 120 illustrated in FIG. 1. The securing strap 120 is a substantially planar elongate member defining a length L, a width W and a suitable thickness, which is configured to be flexible, pliable and/or configured for elastic/plastic deformation. The securing strap may comprise a quadrilateral contour as illustrated, or a suitable polygonal or curvilinear contour or a combination of the above. Furthermore, it is contemplated that in some embodiments, the securing strap 120 may also comprise perforations, slots or apertures of desired dimensions at predetermined locations.

FIG. 1 illustrates the securing strap 120 being affixed to the pipe 110 along a direction that is parallel to or substantially parallel to an axis of the pipe 110. Here, the securing strap 120 is positioned such that the length L of the securing strap 120 extends along or is oriented parallel to or substantially parallel to the axis or longitudinal extent of the pipe 110. That said, in other embodiments, the securing strap 120 is oriented at a non-parallel angle with respect to the axis of the pipe 110. This securing angle may be chosen in the range of 0-90 degrees, for example, 20 degrees, 32 degrees or 45 degrees. Typically, the securing strap 120 is a metal strap made of a suitable grade of stainless steel, carbon steel, or another suitable metal or alloy. Here, the thickness T (not illustrated) of the securing member 120 may be in the range of 0.001 mm to 6 mm (for example, 0.1 mm to 0.6 mm, 0.4 mm to 0.7 mm, 0.2 mm to 1.06 mm, 0.1 mm to 2.5 mm, 2 mm to 3.6 mm, or within, outside or overlapping these ranges), or in ranges of thickness T greater than 6 mm (for example, 2.8 mm to 6.3 mm, 4.3 mm to 9.5 mm, 2.38 mm to 12 mm, or within, outside or overlapping these ranges). That said, in other embodiments, the securing strap 120 may be manufactured out of stainless steels, carbon steels, suitable metals like aluminum, brass, copper, tin, nickel, titanium, alloys, plastics, composites, natural or synthetic materials, polymers, and the like. The materials may be chosen based on their strength, disposition for plastic and elastic deformation without fracture, ductility/malleability, weight, rigidity/flexibility, operative temperature ranges, durability, resistance to fatigue and creep, magnetic properties and the like. In some embodiments, the securing strap 120 is cut from a sheet metal.

Initially, a predetermined portion 122 of the securing strap 120 is suitably fastened or affixed to the pipe 110, as illustrated by FIG. 1. In some embodiments the predetermined securing portion 12 defines free, unfastened portions with lengths L1 and L2 on either side, with portions L1, L2 and the predetermined securing portion 122 together forming the length L. The free portion L2 of the securing strap 120 may be located towards/proximate the portion 112 of the pipe 110 that is required to be insulated, while the opposite free portion L1 may be located away from portion 112. The lengths of the free portions L1 or L2 may be in a range of zero to L (for example, 0.2L, 0.5L, 0.65L and the like). However, the length L1 is typically greater than L2. In some embodiments, the predetermined securing portion 122 is established (or the securing strap is fastened at 122) such that the free portion L1 is substantially three-fourths the length of the strap 120 or 0.75L.

The securing strap 120 may be fastened/affixed to the pipe 110 using any suitable method. In some embodiments, and particularly in the instances of metal securing straps 120, the securing strap 120 may be attached at portions 122 using electrical spot welding, metal inert gas (MIG) welding, tungsten inert gas (TIG) welding, arc welding, gas welding, or other welding methods. FIG. 1 illustrates the securing strap 120 being spot welded to the pipe 110 at multiple spots/locations 124. As such any suitable method for permanently or removably fastening the securing strap 120 may be employed, such as using fasteners such as rivets, bolts, clasps, and the like, or using glue or other adhesives. Once the securing strap 120 is fastened to the pipe 110, a pipe insulation/composite insulating sleeve/cover is provided over the pipe portion 112 and its ends are trimmed. The pipe insulation may extend over a portion of the securing strap typically terminating at or before the free portion L1. Next, an elongate portion of a band clamp is inserted into a coupling member, and the assembly is used to secure the insulation to the pipe 110. These features are described in detail below.

Figure 2A:
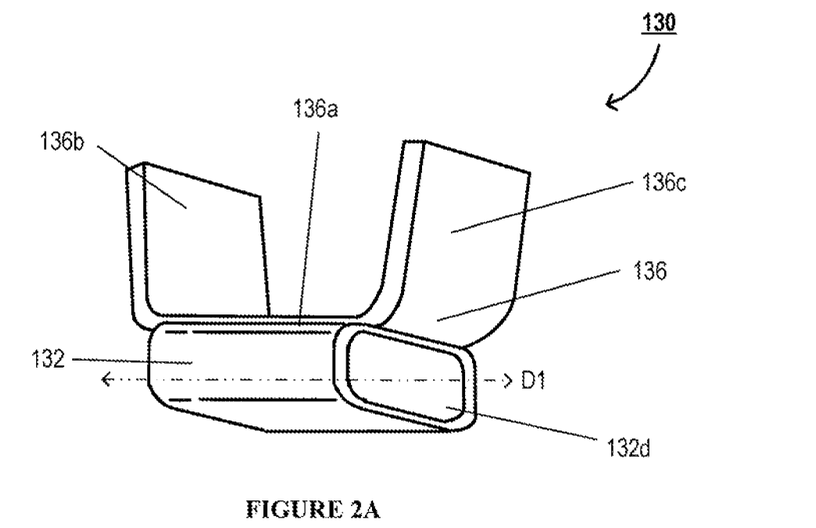
FIG. 2A illustrates a right side perspective view of a coupling member 130 in accordance with some embodiments of the invention.
Figure 2B:
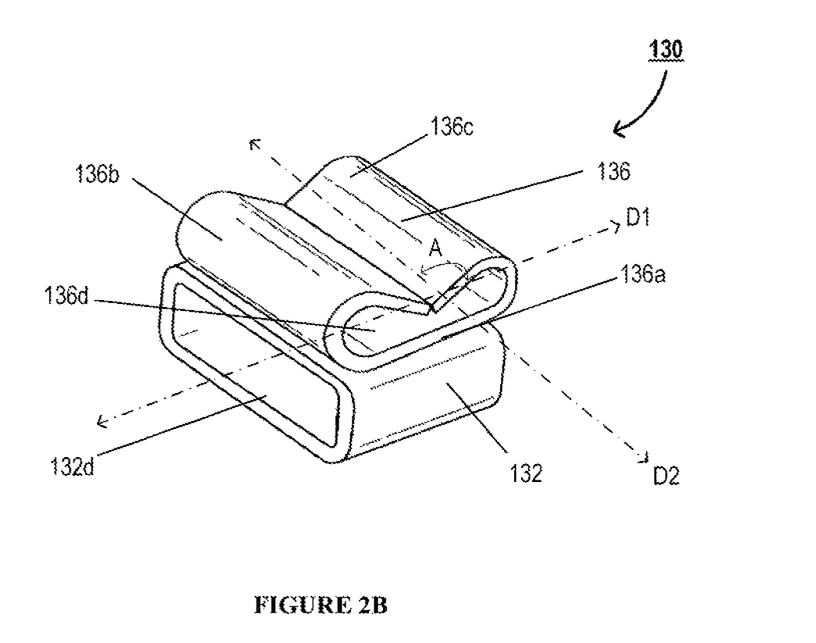
FIG. 2B illustrates a left side perspective view of the coupling member 130, in accordance with some embodiments of the invention.

Now referring to FIGS. 2A and 2B illustrating perspective views of a coupling member 130 in accordance with some embodiments of the invention. The coupling member 130 is a fastener or a clip that is configured to affix two non-parallel or transverse elongate members defining a first angle A between them. Specifically, the coupling member 130 comprises a first connector 132 and an adjacent second connector 136. Typically, the first connector 132 comprises an aperture or opening 132d configured for receiving an elongate member (such as the securing strap 120 or a band clamp) through it in a predetermined first direction D1. In this regard, in some instances, the first connector 132 has a loop or ring structure, as illustrated by FIGS. 2A and 2B. Typically, the second connector 136 comprises a "U" shaped elongate member, provided adjacent the first connector 132 with a central portion 136a being affixed/fastened to a surface of the first connector 132 and two free ends 136b and 136c on either sides, as illustrated by FIG. 2A. Furthermore, the second connector 136 is affixed to the first connector 132 such that the extent/length of the second connector 136 (in a direction successively along 136b, 136a and 136c) and the predetermined first direction of the aperture 132d define a second angle B between them. In some embodiments, the central portion 136a of the second connector 136 comprises a securing aperture 136e (illustrated in FIGS. 4A and 4B) extending therethrough. Typically, the securing aperture 136e extends through the adjacent portion of the first connector 132 such that the aperture provides access to a portion of an elongate member positioned in the opening 132d. In some embodiments, the first connector 132 comprises another securing aperture (securing aperture 132e illustrated in FIG. 3A) similar to the securing aperture 136e on a portion away from/opposite the second connector 136, either alone or in conjunction with the securing aperture 136e. In the embodiments where the coupling member comprises two securing apertures (the securing aperture 136e and opposing securing aperture 132e), the securing apertures may be positioned such that their axes are substantially coincident along a line perpendicular to the central portion 136a.

In some embodiments, the sum of the first angle A between the elongate members to be received by the coupling member 130 and the second angle B defined by the first and second connectors (132, 136) is about 90 degrees. Therefore, in some instances, the second angle B between the length of the second connector 136 and the predetermined first direction of the aperture is chosen such that B=90−A. FIGS. 2A and 2B illustrate one embodiment of the coupling member 130 that is configured to affix two elongate members perpendicularly, with the first angle A between them being substantially 90 degrees. Following from the discussion above, the second connector 136 is affixed to the first connector 132 such that the extent/length of the second connector 136 is parallel or at a zero second angle B, with the direction of aperture 132d, as illustrated.

Furthermore, FIG. 2A illustrates a right side perspective view of the coupling member 130, with the free ends (136b, 136c) of the second connector 136 being in an open position. FIG. 2B illustrates a left side perspective view of the coupling member 130, with the free ends (136b, 136c) of the second connector 136 being formed/bent/plastically deformed into a closed position (from the open position) forming an aperture or loop 136d for receiving an elongate member through it in a predetermined second direction D2, transverse to the predetermined first direction of the aperture 132d. However, it is also contemplated that, in other embodiments, a second connector defining a loop/aperture that is substantially similar to the first connector also defining a loop/aperture is affixed to the first connector such that the apertures are oriented transversely in order to form the coupling member. As such, the coupling member 130 may be configured to be plastically and/or elastically deformed. In some embodiments, the first connector 132 and/or the second connector 136 are manufactured from the same material as the securing strap 120, or alternatively, the connectors (132, 136) are manufactured from a suitable metal, alloy, composite, plastic or non-metal. In some embodiments, the securing strap 120 is manufactured from stainless steel or another carbon steel.

Figure 3A:
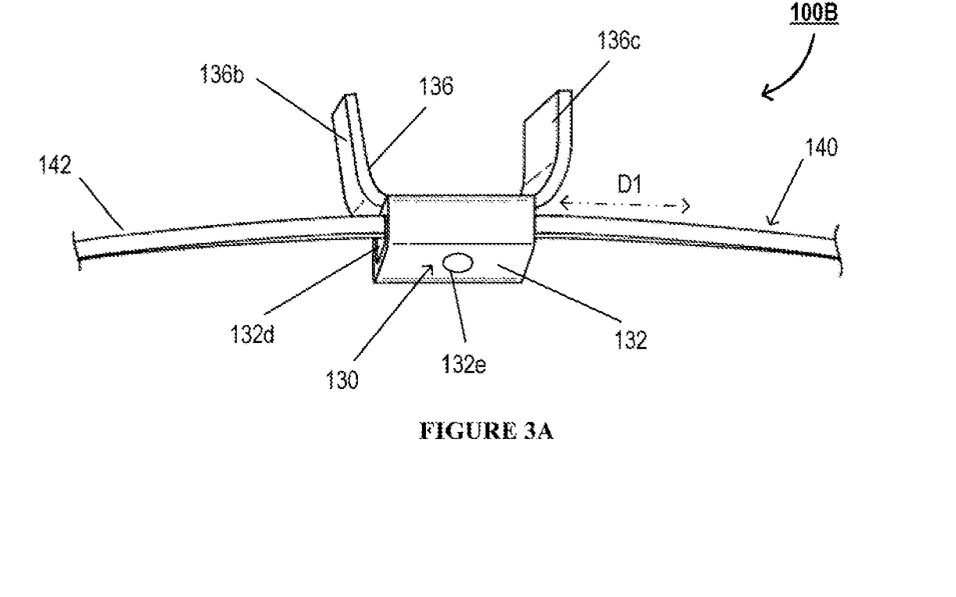
FIG. 3A illustrates a front view of the band clamp insulation system 100B in accordance with some embodiments of the invention.
Figure 3B:
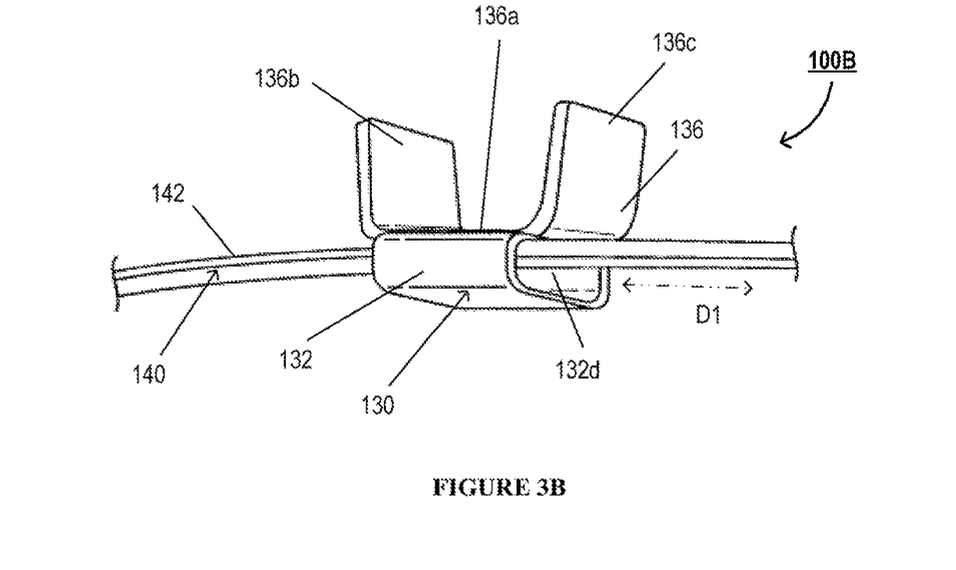
FIG. 3B illustrates a right side perspective view of the band clamp insulation system 100B of FIG. 3A, in accordance with some embodiments of the invention.

Now referring to FIGS. 3A and 3B illustrating the band clamp insulation system 100B in accordance with some embodiments of the invention. FIG. 3A illustrates a front view of a band clamp 140 being coupled with the coupling member 130. Band clamps 140 typically comprise an elongate member or band 142 of a suitable length and width that is configured to surround/enclose an outer circumference of the pipe 110. The band clamp 140 further comprises a band securing member or clamping member 144 (illustrated in FIG. 5) configured for securing the ends of the elongate member around the circumference of the pipe 110, such that the band clamp 140 applies a desired compression force (for example, radial and circumferential compression forces) on the pipe 110 thereby securing pipe insulation between itself and the pipe 110. These features will be described in detail elsewhere in this disclosure.

FIG. 3A illustrates the elongate member 142 of the band clamp 140 being inserted through the aperture 132d of the first connector 132. As such, the aperture 132d may be sized and dimensioned to receive the elongate member 142. In some embodiments, the aperture 132d is sized and dimensioned to receive the elongate member 142 with a predetermined clearance. In some instances, this predetermined clearance is configured to constrain the motion (linear and/or rotational) and/or degrees of freedom of the elongate member 142 within/relative to the first connector 132, while allowing movement in the predetermined first direction D1 of the aperture 132d. Accordingly, the elongate member 142 may slide/move along its length/extent through the aperture 132d, although other relative motions such as rotation of the elongate member 142 within the aperture 132d or linear motion of the elongate member 142 transverse to the predetermined first direction may be constrained. FIG. 3B illustrates a right side perspective view of the assembly 100B of FIG. 3A, in accordance with some embodiments of the invention. Typically, one end of the elongate member 142 is inserted through the aperture 132d and the coupling member 130 is linearly displaced along the length of elongate member 142 to a predetermined location of the member 142. For the embodiments, with multiple securing straps 120 along the circumference at suitable angular intervals, multiple coupling members 130 may be provided on the elongate member 142 and positioned such that each coupling member 130 is proximate to a corresponding securing strap 120 when the band clamp 140 is positioned around the circumference of the pipe 110.

As a summary of the preceding discussion, the securing strap 120 is suitably fastened to the pipe 110, and a pipe insulation/composite insulating sleeve/cover is provided over the pipe portion 112 and its ends are trimmed. Next, the elongate portion 142 of the band clamp 140 is suitably inserted into and positioned within the coupling member 130. Next the coupling member 130 and band clamp 140 assembly 100B of FIGS. 3A and 3B is positioned/situated on the pipe assembly 100A of FIG. 1 for securing the insulation to the pipe 110, as illustrated by FIG. 4A.

Figure 4A:
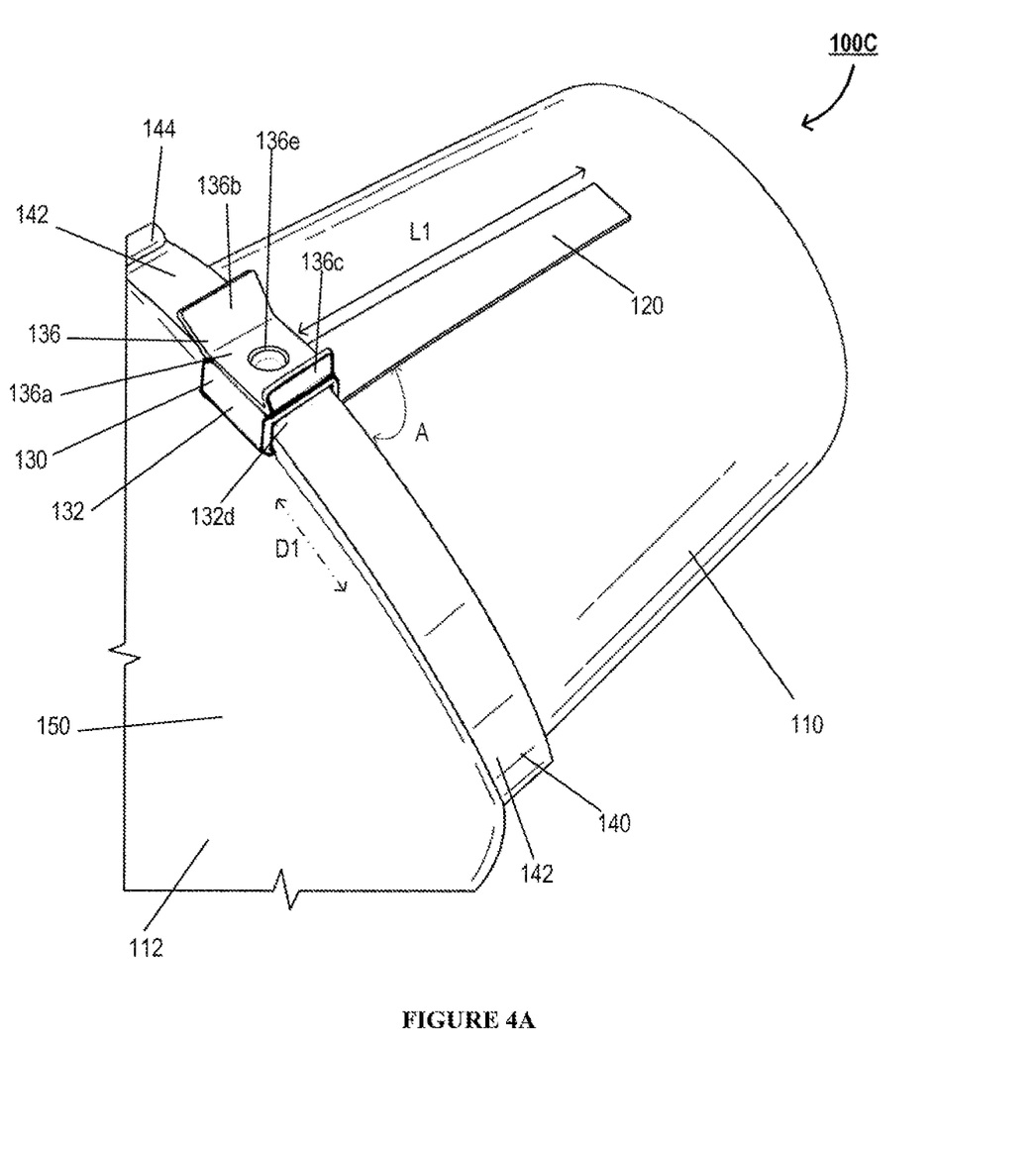
FIG. 4A illustrates a perspective view of the band clamp insulation system 100C, in accordance with some embodiments of the invention.
Figure 4B:
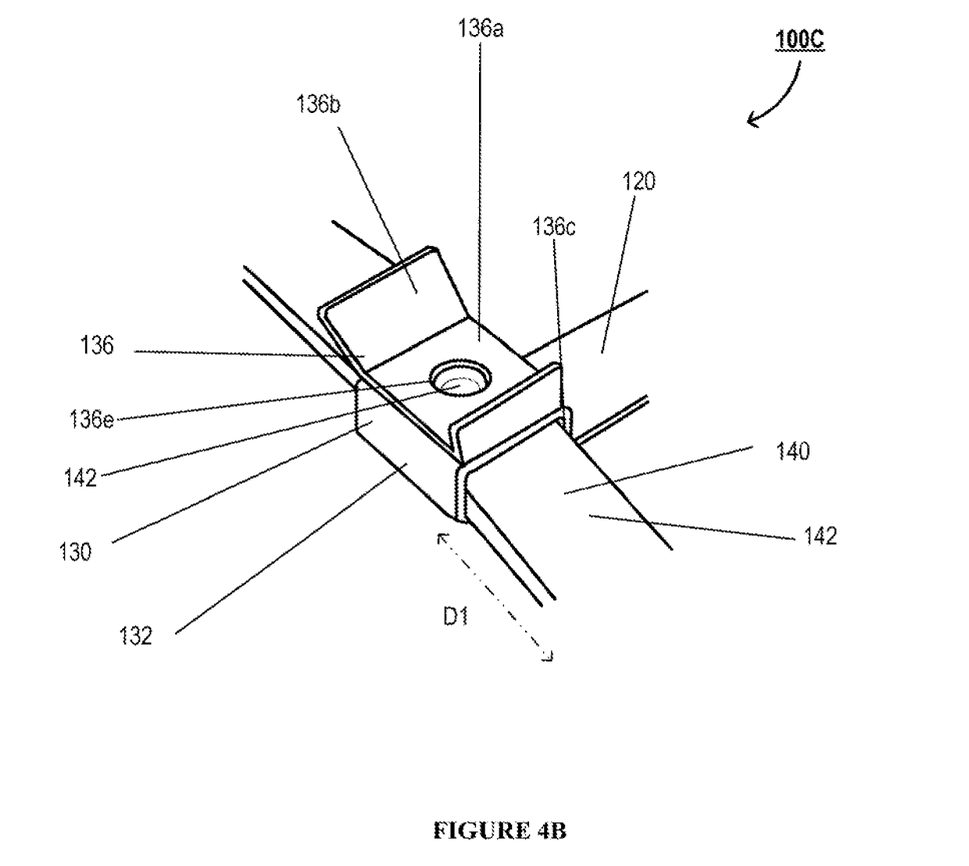
FIG. 4B illustrates a perspective sectional view of the band clamp insulation system 100C of FIG. 4A, in accordance with some embodiments of the invention.

FIG. 4A illustrates a perspective view of the band clamp insulation system 100C, in accordance with some embodiments of the invention. Specifically, FIG. 4A illustrates a pipe 110 with the securing strap 120 being suitably affixed. FIG. 4A further illustrates pipe insulation/composite insulation 150 provided around the predetermined portion 112 of the pipe 110, such that at least a portion of the length L1 of the securing strap 120 is not covered by the insulation 150. In this regard, the insulation 150 may be trimmed at the edges to ensure uniform ends and/or to ensure that at least a portion of the length L1 of the securing strap 120 is not covered by the insulation 150. Next, the coupling member 130 and band clamp 140 assembly 100B of FIGS. 3A and 3B is positioned/situated on the pipe 110 such that (i) the pipe insulation 150 is positioned between the elongate member 142 of the band clamp 140 and the outer surface of the pipe 110, and (ii) the coupling member is positioned proximate and/or aligned with the securing strap 120 and particularly its portion L1. In addition, the coupling member 130 is further linearly displaced or adjusted along the elongate member 140 to ensure the second connector 136 is aligned with the securing strap 120, after the clamp assembly is positioned on the pipe 110. In this regard, the coupling member 130 is configured to secure two elongate members, i.e., the elongate member 142 of the band clamp 140 and the securing strap 120, the elongate member 142 and the securing strap 120 defining the first angle A between them. Furthermore, as illustrated by FIG. 4A, the coupling member 130 is positioned on the elongate member 142 such that the second connector 136 is located adjacent the securing strap 120. Once the coupling member 130 is suitably aligned with the securing strap 120, and particularly the portion L1, in some embodiments, the coupling member 130 and particularly the first connector 132 is plastically deformed and/or structurally modified to restrict/inhibit all relative motion or degrees of freedom between the coupling member 130 and the band clamp 140, thereby fixing the coupling member thereon. For instance, in some embodiments, compressive force (for example, by stamping or punching) is applied on the central portion 136a towards a radial direction of the pipe 110 to eliminate/modify the clearance between the aperture 132d and the elongate member 142 such that the coupling member 130 cannot be linearly displaced or slid along the elongate member 142. Specifically, in some embodiments, the compressive force is applied to the elongate member 142 via the securing aperture 136e, as will be described with respect to FIG. 4B illustrating a sectional view of assembly 100C. In some embodiments, once the coupling member 130 is suitably aligned with the securing strap 120, a punch tool or a punch is used to punch/stamp the elongate member 142 through the securing aperture 136e, causing deformation of the elongate member 142 such that relative motion along the direction D1 is arrested. In some embodiments, the deformed portion of elongate member 142 is received in the opposite securing aperture 132e, further constraining relative motion between the coupling member 130 and the elongate member 142.

Figure 5:
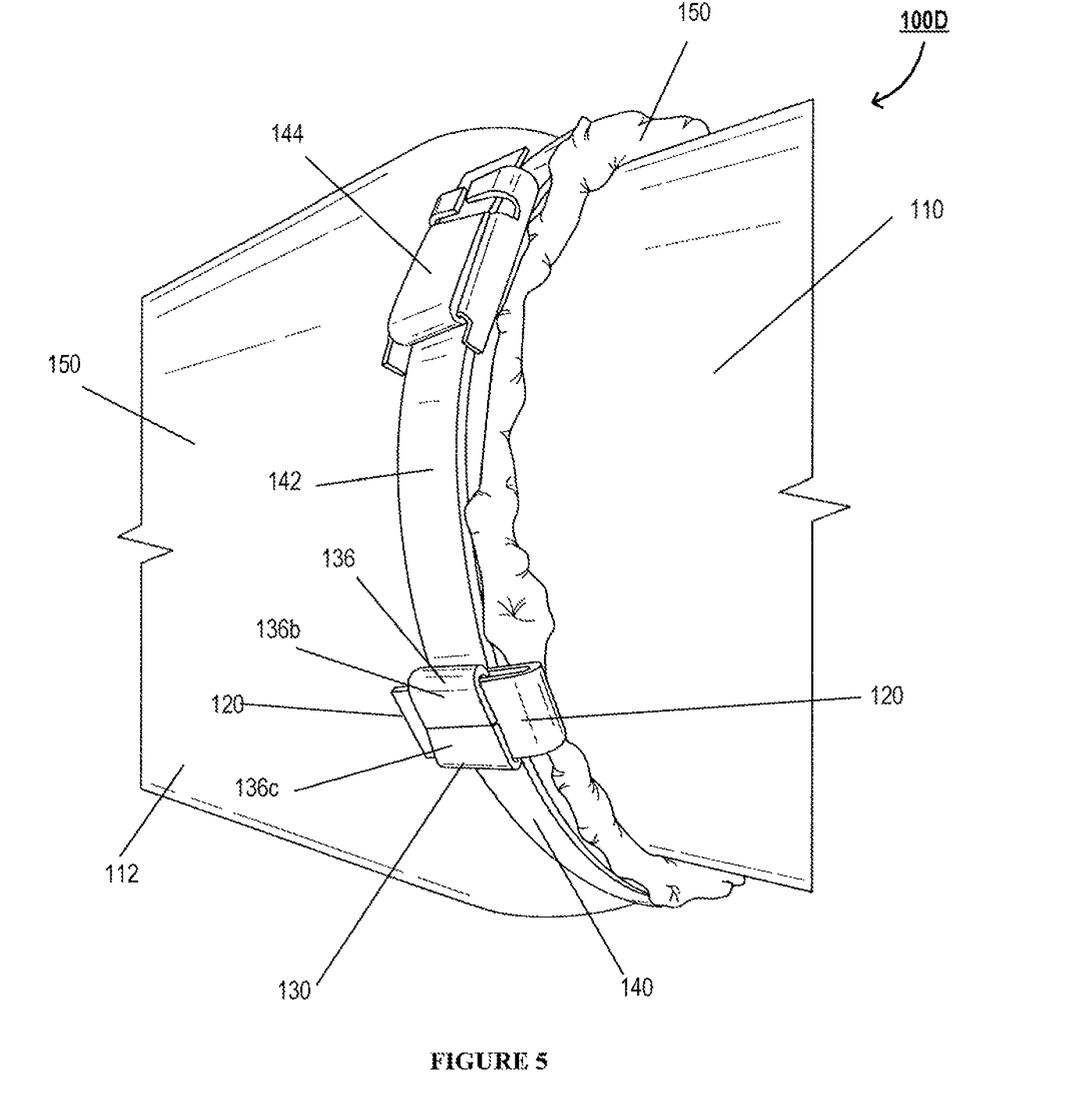
FIG. 5 illustrates a perspective view of the band clamp insulation system 100D in accordance with some embodiments of the invention.

Now referring to FIG. 5, illustrating the band clamp insulation system 100D in accordance with some embodiments of the invention, subsequently, the ends of the band clamp 140 are secured using the clamping member/clip 144. Next, the securing strap 120 (i.e. the portion L1) is bent/folded over the coupling member 130 such that a portion of the securing strap 120 rests along the central portion 136a of the second connector 136. The two free ends 136b and 136c on either sides are then folded over the securing strap 120, forming the loop 136d. In this regard, compressive force may be applied on the free ends 136b and/or 136c for structurally modifying the second connector 136 and the loop 136d to fix or restrain the securing strap 120 within the second connector 136. This unique and novel system described herein, and specifically the coupling member 130 securing strap 120 arrangement, in conjunction with the band clamp 140, fixedly locates the band clamp with increased compressive force for securing the insulation 150. Furthermore, the present invention provides enhanced and superior securing of the insulation 150, impedes the formation of gaps due to differential thermal expansion and thereby greatly increases the longevity of the insulation 150 and the pipe 110. In some embodiments, the one or more securing straps 120 around the circumference of the pipe 110 create eccentricity of the circumference (such as a substantially elliptical circumference), which aids in better securing the insulation around the pipe and/or reducing the adverse effects of differential thermal expansion.

The clamping member 144 as used herein may be any device, tool, or fastener configured to hold or secure two or more elements together, either by mechanical, magnetic, and/or chemical means. In the context of the band clamp 140, the clamping member 144 is configured to hold, secure, fasten, or lock the ends of the elongate member together, either removably or permanently. Typically, the clamping member 144 is configured to secure the ends of the elongate member together, at a desired tension, such that the elongate member 142 forms a loop. In some embodiments, the clamping member 144 is an embodiment of the coupling member 130 where the apertures 132d and 136d are aligned in parallel, while in other embodiments the clamping member may comprise a distinct structure. As such, the clamping member 144 may comprise hose clamps, V-clamps, buckles, locking ties, loops, screw clips, worm drive clips, center punch clamps, spring clamps, wire clamps, ear clamps, strapping seals, cable ties, marman/marmon clamps, clasps, band clips, a combination of portions of the preceding non-limiting examples, or any other suitable clamping devices known in the art. In some embodiments, the clamping member 144 is configured to secure the band clamp 140 around the pipe 110, such that a desired compression (for example, radial and circumferential compression forces) may be applied on the pipe 110 by changing the circumference/dimensions of the loop formed. The elongate member 142 and/or the clamping member 144 may be manufactured as multiple components that are then assembled together or the elongate member 142 and the clamping member 144 may be constructed as a single unit. The elongate member 142 and/or the clamping member 144 may be manufactured out of same or different materials, such as suitable grades of stainless steel, carbon steels, suitable metals like aluminum, brass, copper, tin, nickel, titanium, alloys, plastics, composites, natural or synthetic materials, polymers, and the like.

In some embodiments, the band clamp insulation system 100D may be subjected to appropriate heat treatment processes to achieve desired material/structural characteristics/features. Typically, the pipe insulation 150 is configured to increase, decrease or otherwise regulate the temperature of the fluid within the exhaust pipe so that the fluid is emitted at a desired temperature, and/or regulate the temperature of the pipe 110, particularly at weaker regions like bends and curves. In this regard, in some embodiments, the insulation 150 is made of one or more layers of composite materials, resins, polymers, fabrics, and the like. The insulating cover or sleeve 150 may be placed on the outer surface of the pipe 110 at a desired location and secured as described previously. The pipe 110 along with the insulation 150 and the clamping system (120, 130, and 140) may be subjected to heat treatment and subsequent cooling, such that the insulating material 150 is at least partially molded to the pipe or such that the insulating material hardens around the pipe 110 forming a rigid composite insulation cover/sleeve.

While the present invention has been disclosed with reference to certain embodiments, numerous modifications, alterations and changes to the described embodiments and other new embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the sphere and scope of the appended claims. Although specific terms are employed herein, they are used in a generic and descriptive sense only and not for purposes of limitation. Accordingly, it is intended that the present invention not be limited to the described embodiments, but that it has the full scope defined by the language of the following claims, and equivalents thereof. In addition, where possible, any terms expressed in the singular form herein are meant to also include the plural form and/or vice versa. As used herein, "at least one" shall mean "one or more" and these phrases are intended to be interchangeable. Accordingly, the terms "a" and/or "an" shall mean "at least one" or "one or more," even though the phrase "one or more" or "at least one" is also used herein. Furthermore, references to "one embodiment" of the present invention are not intended to be interpreted as excluding the existence of additional embodiments that also incorporate the recited features. The following claims are in no way intended to limit the scope of the disclosure to the specific embodiments described herein. While the foregoing is directed to embodiments of a corrugated band clamp, and components thereof, other and further embodiments may be devised without departing from the basic scope thereof, and the scope thereof is determined by the claims that follow.

What is claimed is:

1. A band clamp insulation system configured for a hollow tubular member and alleviating formation of gaps due to differential thermal expansion of the hollow tubular member and an insulation, the system comprising:

a securing member having a first elongate member, wherein a predetermined fixing portion of the securing member is configured to be affixed to the hollow tubular member;

a band clamp member configured for securing an insulation cover between the band clamp member and the hollow tubular member, wherein the band clamp member comprises a second elongate member and a clamping member; and a coupling member configured for fastening the first elongate member affixed to the hollow tubular member and the second elongate member positioned around the hollow tubular member;

wherein the coupling member comprises a first connector receiving the second elongate member, and an adjacent second connector receiving a flexible free portion of the first elongate member folded over the predetermined fixing portion.

2. The band clamp insulation system of claim 1, wherein the coupling member is configured to fasten the first elongate member and the second elongate member at a first angle between 0 degrees and 90 degrees.

3. The band clamp insulation system of claim 1, wherein the coupling member is configured to fasten the first elongate member transversely with the second elongate member.

4. The band clamp insulation system of claim 1,
wherein the first elongate member is oriented in a direction transverse to the second elongate member.

5. The band clamp insulation system of claim 4, wherein the second connector comprises a central portion affixed to the first connector and two flexible free portions on either side of the central portion.

6. The band clamp insulation system of claim 5, wherein the two flexible free portions are configured to be folded over the central portion for securing the first elongate member.

7. A band clamp insulation assembly configured for insulating a hollow tubular member, comprising:

a securing member positioned on an outer surface of the hollow tubular member, the securing member having a first elongate member, wherein a predetermined portion of the planar securing member is affixed to the hollow tubular member;

an insulation cover positioned around the hollow tubular member;

a band clamp member positioned around the hollow tubular member, the band clamp member securing the insulation cover between the band clamp member and the hollow tubular member, wherein the band clamp member comprises a second elongate member and a clamping member; and a coupling member configured for fastening the first elongate member affixed to the hollow tubular member and the second elongate member positioned around the hollow tubular member;

wherein the coupling member comprises a first connector receiving the second elongate member, and an adjacent second connector receiving a flexible free portion of the first elongate member folded over the predetermined fixing portion.

8. The band clamp insulation assembly of claim 7, wherein the securing member is oriented in a direction substantially parallel to a longitudinal axis of the hollow tubular member.

9. The band clamp insulation assembly of claim 7, wherein the coupling member is positioned on the band clamp member with the second elongate member extending through the first connector.

10. A method of providing insulation for a hollow tubular member, the method comprising:

providing a hollow tubular member, the hollow tubular member defining a longitudinal axis;

providing a securing member having a first elongate member;

positioning the securing member on an outer surface of the hollow tubular member and, securing a predetermined portion of the securing member to the hollow tubular member;

providing an insulation cover;

positioning the insulation cover around the hollow tubular member such that the insulation cover overlaps at least a portion of the securing member;

providing a band clamp coupling assembly comprising:

a band clamp member comprising a second elongate member and a clamping member; and a coupling member configured for fastening the first elongate member affixed to the hollow tubular member and the second elongate member positioned around the hollow tubular member, wherein the coupling member comprises a first connector receiving the second elongate member, and an adjacent second connector receiving a flexible free portion of the first elongate member folded over the predetermined portion;

wherein the second elongate member is inserted through the coupling member;

positioning the band clamp coupling assembly around the hollow tubular member, the band clamp member securing the insulation cover between the band clamp member and the hollow tubular member.

11. The method of claim 10, wherein securing the predetermined portion of the planar securing member to the hollow tubular member comprises spot welding the first elongate member to the hollow tubular member at the predetermined portion.

* * * * *